Sept. 22, 1925.
J. DICK
1,554,419
REVERSING GEARING
Filed July 25, 1919     4 Sheets-Sheet 3
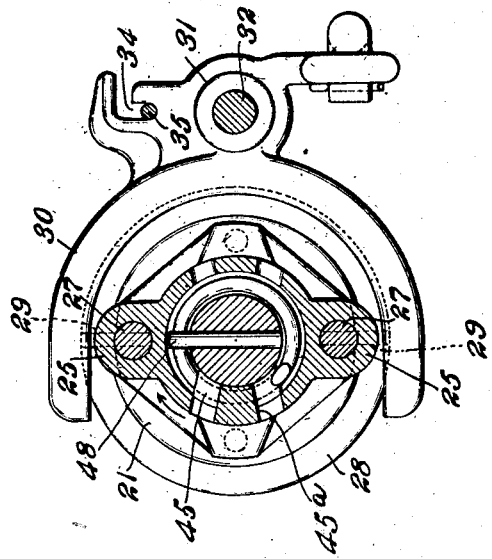
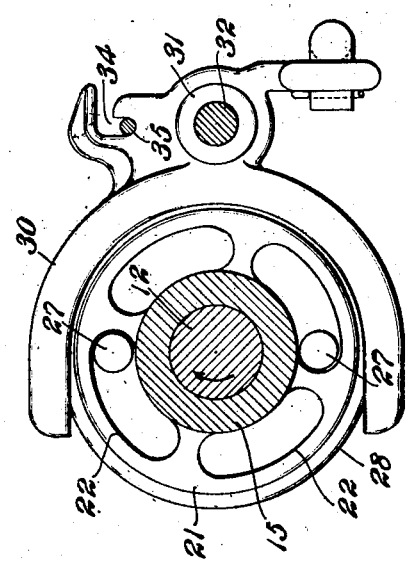
INVENTOR,
Joseph Dick,
BY Frease, Merkel, Saywell and Bond
ATTYS.

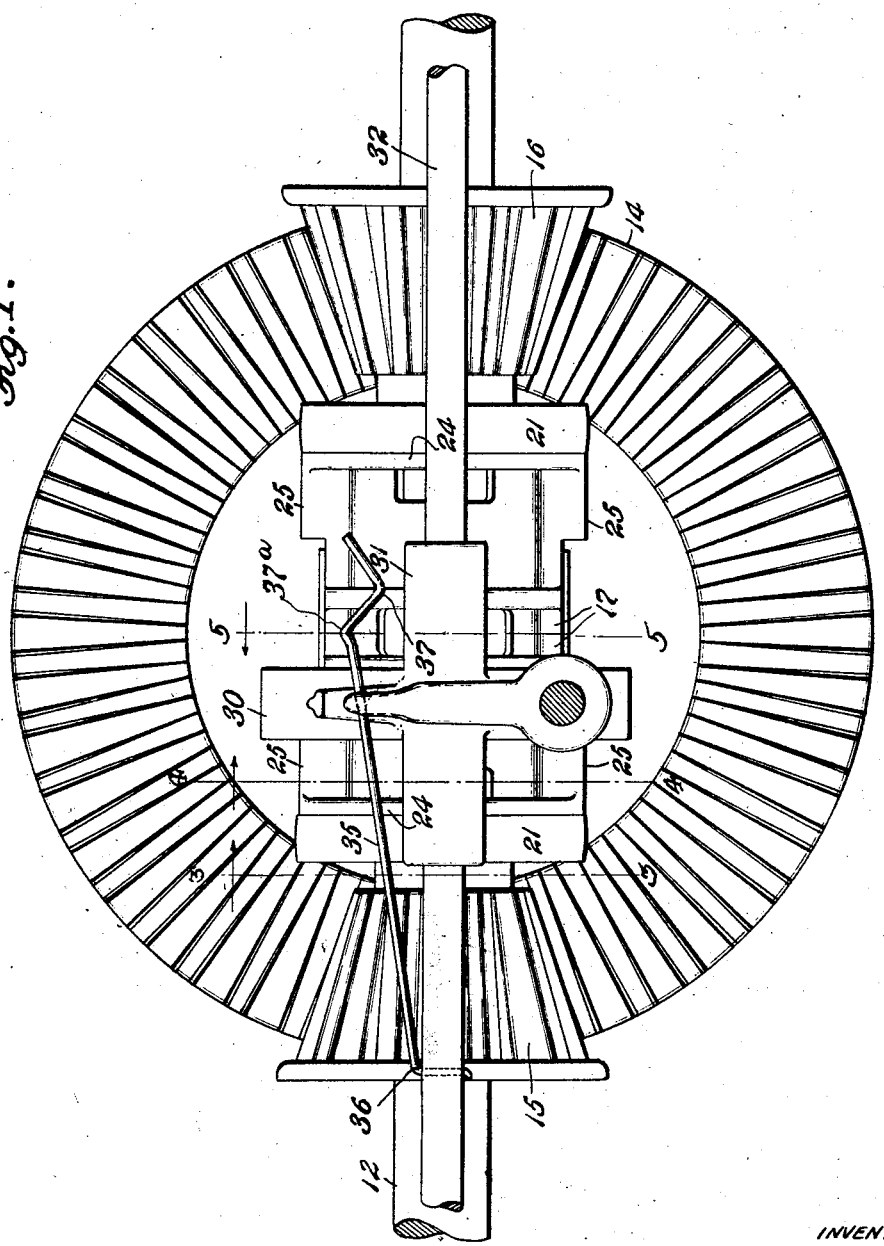

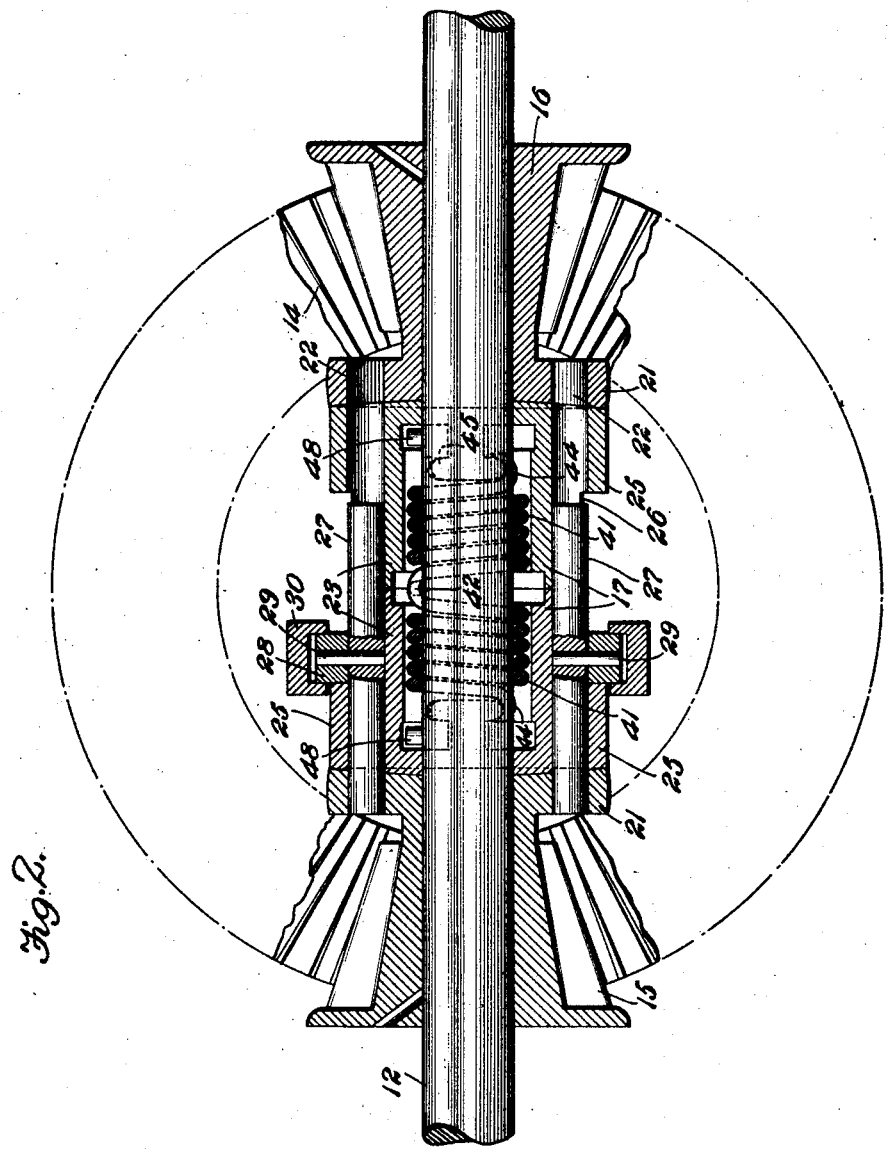

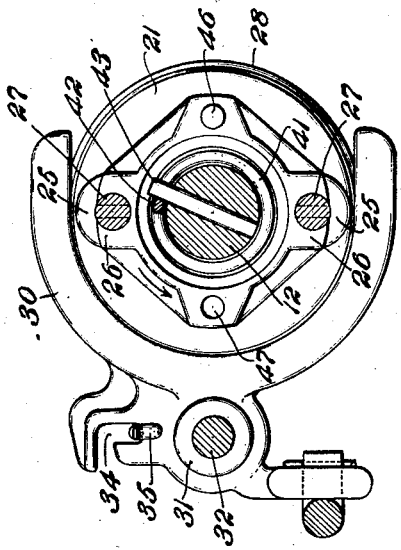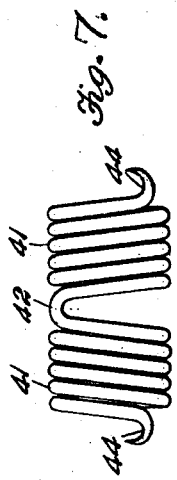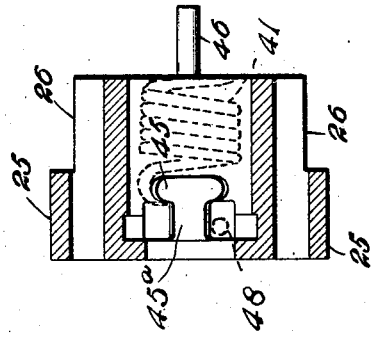

Patented Sept. 22, 1925.

1,554,419

UNITED STATES PATENT OFFICE.

JOSEPH DICK, OF CANTON, OHIO, ASSIGNOR TO THE JOSEPH DICK MANUFACTURING COMPANY, OF CANTON, OHIO, A CORPORATION OF OHIO.

REVERSING GEARING.

Application filed July 25, 1919. Serial No. 313,202.

*To all whom it may concern:*

Be it known that I, JOSEPH DICK, a citizen of the United States, residing at Canton, in the county of Stark and State of Ohio, have invented certain new and useful Improvements in Reversing Gearing, of which the following is a specification.

The invention relates to fodder cutters, and more especially to the reversing gearing for the feed mechanism in machines for cutting fodder and other forage, like alfalfa and similar plants which are inclined to become tangled and bunched together. Such fodder sometimes bunches and chokes in the throat of the conveyer to such an extent as to impede or stop the operation of the machine, thus making it necessary to reverse the conveyer.

A reversing of the feed mechanism under these circumstances, places an excessive load upon the gearing, and the initial strain upon the reversed mechanism may be greater than when operating the feed mechanism forward; and after the choked condition of the throat has been relieved, and the gearing thrown into position for again feeding the machine, the same is operated at once under substantially a full load. It is evident that the strain of a sudden starting and reversing of the conveyer under full load produces such a sudden shock upon the clutch members of the reversing gearing as to unduly wear and sometimes break the interengaging parts.

The objects of the invention are to provide a reversing gearing for the feed mechanism with a yielding engagement of the clutch members so that the same can be operated when the machine is under load, to either reverse the conveyer or start it forward, after reversing, without causing a sudden shock to the clutch gearing and the feed mechanism; to provide a construction of controlling gearing in which the clutch member rotates loosely between the pinions and without any end thrust or frictional contact between the clutch and the pinions; to provide a selective coupling means for positively coupling the clutch member to either of the pinions; and to generally improve and simplify mechanism of this character.

The invention thus set forth in general terms is illustrated in the accompanying drawings forming part hereof, in which—

Fig. 1 is a side elevation upon an enlarged scale of the controlling gearing and clutch mechanism.

Fig. 2 is a vertical longitudinal section through the controlling gearing and clutch mechanism.

Fig. 3 is a section on line 3—3, Fig. 1.

Fig. 4 is a section on line 4—4, Fig. 1.

Fig. 5 is a section on line 5—5, Fig. 1.

Fig. 6 is a longitudinal vertical sectional view of one of the clutch members.

Fig. 7 is a plan view of the spring contained within the double clutch.

A practical embodiment of the invention is disclosed in the accompanying drawings, forming a part of this specification in which similar numerals of reference indicate corresponding parts throughout the several views.

The reversing gearing may include a driving shaft 12 extending along the face of a beveled gear wheel 14 operatively mounted along side the shaft to be driven one way or the other by a continuous rotation thereof.

The pinions 15 and 16 are both of the same construction and are oppositely disposed upon the driving shaft 12 upon each side of the clutch member 17. Each of these pinions is provided upon its inner extremity with an integral annular flange 21, a plurality of concentric curved slots 22 being formed in these flanges.

Each of the clutch members 17 comprises a tubular body portion 23 of larger internal diameter than the shaft 12 and provided at its outer end with an annular flange 24 of substantially the same external diameter as the flanges 21, the internal diameter of said flange being of suitable size to allow it to rotate upon the shaft 12. A pair of longitudinally disposed diametrically opposite bearings 25 is formed upon each of the clutch members; the inner half of each of these bearings comprising a half bearing as indicated at 26. The bearings of the two clutch members are aligned axially with each other and a coupling bar 27 is slidably mounted through each aligned pair of bearings.

Each of these coupling bars is of less length than the combined length of the two clutch members 17; thus when the bars are moved into the inoperative position the pinions 15 and 16 will rotate idly upon the driving shaft 12. A ring 28 is located around the clutch and provided with the pins 29, which extend through suitable apertures in the coupling bars thus making both bars movable longitudinally with the ring.

A yoke 30 of channel cross sectional form receives the ring 28, said yoke being provided with a sleeve portion 31 which is slidably mounted upon the rod 32 mounted along the sides of the shaft 12. A slot 34 is formed in the yoke and arranged to receive the spring 35 which is connected at 36 to the rod 32, the free end of said spring being provided with the V protrusion 37, and the V recess 37ª on the inner side thereof.

When the yoke 30 is moved into the position to drive the feed conveyer (not shown) forward by coupling the pinion 16 to the clutch, the slot 34 in the yoke will engage the outer side of the V protrusion for holding the coupling in operating position and when the yoke is moved into the neutral position the V recess 37ª of the spring 35 will hold the yoke against movement from the neutral position. When the pinion 15 is coupled to the clutch the conveyer will be reversed and when the pinion 16 is coupled to the clutch the conveyer will be driven forward. When the pinion 15 is in mesh the bevelled gear 14 in the feed conveyer will be reversed, but as the conveyer is never reversed for any great length of time it is not necessary to provide any means for holding the clutch in mesh with the pinion 15.

A double helical spring comprising a pair of helices 41 is located around the shaft 12 and contained within the double clutch. This spring is formed from a single strand of wire, the convolutions of the two helices being oppositely coiled, a central U-shaped portion 42 being formed between the helices. A pin 43 is located through the shaft 12 and engages the U-shaped portion of the spring. Hooks 44 disposed oppositely to the U-shaped portion 42 are formed upon the extremities of the spring and arranged to be engaged by the inwardly disposed T-shaped lugs 45 formed within the clutch members 17. The clutch members 17 are at all times coupled together and held against relative movement with relation to each other by means of the pins 46 which are located through longitudinal apertures 47 in the two clutch members; and pins 48 protrude from the shaft 12 in position to abut the stems 45ª of the T-lugs 45 and cooperate therewith to rotate the clutch member by the shaft.

When the clutch is in the neutral position and it is desired to throw it into mesh with the pinion 16 to drive the feed conveyer forward the yoke 30 and the ring 28 are moved into a position opposite from that illustrated in Figs. 1 and 2, the shaft 12 and the clutch members rotating as shown by arrows in Figs. 3, 4 and 5.

As the coupling bars enter the apertures 22 they at once engage the ends thereof, as shown in Fig. 3, and the resistance or inertia of the pinion 16 is gradually overcome by the action of the spring 41, which yields with increasing torsion until the shaft 12 has continued its rotation to bring the shoulder formed by the protruding pin 48 into abutment with the shoulder formed by the stem 45ª of the T-lug 45; whereupon the clutch member and the pinion are both positively rotated with the shaft 12.

For reversing the machine, the yoke is moved in the opposite direction to bring the other ends of the coupling bars into engagement with the apertures 22 of the pinion 15; and the action of corresponding parts is the same as that described above. When the load is removed from the machine, or the clutch member moved into neutral position, the spring 41 rotates the clutch member back into normal position on the shaft 12 as shown in Figs. 2 and 4.

It will be understood that the yielding action of the spring 41 in each case, permits the coupling bars to move endwise into engagement with one of the pinions without a sudden shock, and that the load is not taken up and carried by a positive action until the ends of the bars have moved quite fully into the apertures of the pinion.

And it is also evident that the clutch member itself is not moved endwise on the shaft and that there is no end thrust of the same against either one of the pinions; the engagement with the pinions being accomplished entirely by the protruded ends of the coupling bars bearing squarely against the ends of the pinion apertures. These apertures are preferably although not necessarily elongated, as shown, to permit the ends of the bars to more readily find and enter therein.

I claim:—

1. Reversing gearing for the feed mechanism of a fodder cutter or the like, including a drive shaft with two pinions journalled thereon, a bevelled gear meshing with the pinions, a clutch journalled on the shaft between the pinions, means for engaging the clutch with either one of the pinions, yielding means for initially engaging the clutch with the shaft, and positive cooperating shoulders for subsequently stopping the rotation of the clutch on the shaft.

2. Reversing gearing for the feed mechanism of a fodder cutter or the like including a drive shaft with two pinions journalled thereon, a bevelled gear meshing with the pinions, a clutch journalled on the shaft between the pinions, coupling bars movable endwise in the clutch for engagement with either one of the pinions, yielding means for initially engaging the clutch with the shaft, and means for subsequently stopping the rotation of the clutch on the shaft.

3. Reversing gearing for the feed mechanism of a fodder cutter or the like including a drive shaft with two pinions journalled thereon, a bevelled gear meshing with the pinions, a clutch journalled on the shaft between the pinions, means for engaging the clutch with either one of the pinions, a double helical spring engaged at its middle to the shaft, hooks on the ends of the spring and lugs in the clutch in the path of the hooks for engagement therewith, and means for stopping the clutch after the spring is twisted by engagement of the hook and the lug.

4. Reversing gearing for the feed mechanism of a fodder cutter or the like including a drive shaft with two pinions journalled thereon, a bevelled gear meshing with the pinions, a clutch journalled on the shaft between the pinions, means for engaging the clutch with either one of the pinions, a helical spring on the shaft, means on the shaft and on the clutch for engaging the spring and positive cooperating shoulders for stopping the clutch on the shaft after an engagement of the spring.

5. Reverse gearing for the feed mechanism of a fodder cutter or the like including a drive shaft with two pinions journalled thereon, a bevelled gear meshing with the pinions, a clutch mounted on the shaft between the pinions, coupling bars movable endwise in the clutch for engagement with either one of the pinions, means for moving the coupling bars, and a spring for releasably holding the moving means in different positions.

JOSEPH DICK.